United States Patent
Huilgol et al.

(12) 
(10) Patent No.: US 6,522,529 B1
(45) Date of Patent: Feb. 18, 2003

(54) ROTATABLE COMPUTER DISPLAY APPARATUS AND METHOD

(75) Inventors: Vivek R. Huilgol, 5636 S. Lakeshore Dr., 190 724, Shreveport, LA (US) 71119; Jeffrey R. Braun, Colgate, WI (US)

(73) Assignee: Vivek R. Huilgol, Shreveport, LA (US)

( * ) Notice: Subject to any disclaimer, the term of this patent is extended or adjusted under 35 U.S.C. 154(b) by 0 days.

(21) Appl. No.: 09/577,412

(22) Filed: May 22, 2000

(51) Int. Cl.$^7$ .............................. G06F 1/16; E04G 3/00
(52) U.S. Cl. ...................... 361/681; 361/683; 248/919
(58) Field of Search ................................. 361/681–683, 361/724–727, 807, 809; 439/53, 152, 157; 248/73, 535, 536, 919–923

(56) References Cited

U.S. PATENT DOCUMENTS

| | | | |
|---|---|---|---|
| 3,662,981 A | 5/1972 | Hogrebe | 248/278 |
| 4,267,555 A | 5/1981 | Boyd et al. | 340/748 |
| 4,542,377 A | 9/1985 | Hagen et al. | 340/727 |
| 4,731,030 A | 3/1988 | Johnston | 439/6 |
| 4,814,759 A * | 3/1989 | Gombrich et al. | 340/771 |
| 5,016,849 A | 5/1991 | Wu | 248/183 |
| 5,024,415 A | 6/1991 | Purens | 248/923 |
| D322,063 S | 12/1991 | Oyama | D14/113 |
| 5,100,098 A | 3/1992 | Hawkins | 248/917 |
| 5,125,610 A | 6/1992 | Queau | 248/284 |
| 5,128,662 A | 7/1992 | Failla | 340/752 |
| 5,177,616 A | 1/1993 | Riday | 358/254 |
| 5,206,790 A | 4/1993 | Thomas et al. | 361/380 |
| 5,268,817 A * | 12/1993 | Miyagawa et al. | 361/729 |
| 5,321,579 A | 6/1994 | Brown et al. | 361/681 |
| 5,329,289 A | 7/1994 | Sakamoto et al. | 345/126 |
| 5,335,142 A | 8/1994 | Anderson | 261/681 |
| 5,347,630 A | 9/1994 | Ishizawa et al. | 395/164 |
| 5,432,720 A | 7/1995 | Lucente et al. | 364/708.1 |
| 5,434,964 A | 7/1995 | Moss et al. | 395/157 |
| 5,629,833 A | 5/1997 | Ido et al. | 361/681 |
| 5,708,561 A | 1/1998 | Huilgol et al. | 361/681 |
| 5,923,528 A * | 7/1999 | Lee | 361/681 |
| 5,973,915 A * | 10/1999 | Evans | 361/681 |
| 6,189,850 B1 * | 2/2001 | Liao et al. | 248/292.14 |
| 6,233,139 B1 * | 5/2001 | Hamon | 361/681 |
| 6,266,236 B1 * | 7/2001 | Ku et al. | 361/681 |
| 6,272,006 B1 * | 8/2001 | Lee | 361/681 |
| 6,275,376 B1 * | 8/2001 | Moon | 361/683 |
| 6,302,612 B1 * | 10/2001 | Fowler et al. | 403/76 |

FOREIGN PATENT DOCUMENTS

JP 4-58715 5/1992 ............. G06F/1/16

* cited by examiner

Primary Examiner—Darren Schuberg
Assistant Examiner—Lisa Lea-Edmonds
(74) Attorney, Agent, or Firm—Michael Best & Friedrich LLP (57) ABSTRACT

In the display screen apparatus and method of the present invention, a hub or other extension coupled to a display screen is received within an aperture in a body portion (preferably of a screen housing) for sliding, rotation, or both sliding and rotation. A gasket is employed to permit a user to place and hold the display screen in a range of sliding and/or rotational positions with respect to the body portion. In a preferred embodiment of the present invention, the display screen has a screen backing from which the extension extends. Also preferably, the extension is in the form of a hub connected to the screen backing and having an aperture through which screen wiring passes from the display screen into a screen housing. In one preferred embodiment, the gasket is held between a surface of the screen housing and a compression member. Most preferably, the gasket is compressed to an extent sufficient to cause frictional engagement of the gasket and to thereby hold the display screen in desired positions and orientations. The aperture in the body portion preferably permits translation and rotation of the display screen with respect to the screen housing. To limit rotation of the display screen, such as to prevent over-rotation of the display screen in the same rotational direction, the body portion of the screen housing preferably has a stop member which obstructs certain movement of a limit member coupled to the hub.

34 Claims, 7 Drawing Sheets

ROTATABLE COMPUTER DISPLAY APPARATUS AND METHOD

FIELD OF THE INVENTION

The present invention relates to computer displays and more particularly to computer displays capable of rotation generally in the plane of the display.

BACKGROUND OF THE INVENTION

An attractive feature of many conventional computer monitors and displays is the ability to adjust the monitor or display to a user's preference. The term "display" is used herein and in the appended claims to refer to a computer monitor, display, and any other device used in conjunction with a computer for displaying text and/or graphics upon a screen in any manner. The term "display" refers collectively to the screen upon which such text and/or graphics is displayed, as well as the housing, frame, or other structure within or upon which the screen is mounted.

The screen of the display can be in any form, including without limitation a display surface of a cathode ray tube (CRT) or a liquid crystal display (LCD). Numerous devices and mechanisms exist to adjust one or more computer display positional attributes, such as tilt, rotational position, and the like. For example, some computer displays are mounted to a base for rotation thereon via a ball and socket-type connection permitting the display to be rotated about a generally vertical axis. Other computer displays also or instead permit the display to be tilted upwardly or downwardly to the preference of the user. Still other computer displays permit rotation of the display about an axis generally perpendicular to the screen of the display. An example of such a display is disclosed in U.S. Pat. No. 5,708,561 issued to Huilgol et al. A computer display capable of screen rotation about an axis generally perpendicular to the display screen (hereinafter referred to as a computer display having a "rotatable" screen) permits a user to place the screen in at least two orientations: a portrait orientation and a landscape orientation typically about 90 degrees apart. This capability is particularly useful for screens that are rectangular, but can also be used for screens that are square. Specifically, some computer applications are better viewed in landscape format (e.g., with the longer screen dimension in a rectangular screen oriented generally horizontally), while others are better viewed in portrait format (e.g., with the shorter screen dimension in a rectangular screen oriented generally horizontally). As used herein, the terms "landscape" and "portrait" refer to screen orientations that are generally 90 degrees apart, and do not indicate or imply any particular screen shape (e.g., rectangular or square) or dimensions.

Computer displays such as the display disclosed in the Huilgol patent present a number of design difficulties not typically encountered in other computer displays. For example, computer displays capable of rotation about an axis generally perpendicular to the display screen call for electrical connections to the display permitting such rotation. These electrical connections should be protected against binding, pinching, excessive bending, and strain in the range of screen and display movement.

Also, many conventional computer displays capable of such rotation provide only a discreet number of screen positions and orientations, as opposed to an infinite number of screen positions and orientations. Although the computer screen is typically rotatable through a range of screen orientations and/or slidable through a range of screen positions, the screen typically can only be held in a small number (e.g., two or three) orientations and positions.

Another problem for computer displays having rotatable screens is inadvertent or accidental screen movement. During rotation or other movement of the screen, the possibility exists for a user to drop or otherwise release the screen. This can cause the screen to drop or fall a distance in some rotatable screen designs, and can cause undesirable forces to be exerted upon the screen, wiring, or the rest of the display. Such forces can also be generated when the screen is bumped, pushed, or otherwise accidentally moved from one of its discreet orientations or positions described above.

Yet another problem with rotatable screen designs is the need to balance screen movability with display complexity. Complex display designs typically result in a computer display that is more susceptible to breakage and that is more expensive to manufacture, assemble, and repair.

In light of the problems and limitations of the prior art described above, a need exists for a computer display having a rotatable screen that can be moved and held in a range of positions and orientations, that is movable without exposing screen electrical connections to excess stress, that is resistant to damage by screen movement, and that is easy and inexpensive to manufacture, assemble, and repair. Each preferred embodiment of the present invention achieves one or more of these results.

SUMMARY OF THE INVENTION

In the display screen apparatus and method of the present invention, a hub or other extension one preferred embodiment of coupled to a display screen is received within an aperture in a body portion (preferably of a screen housing) for sliding, rotation, or both sliding and rotation. A gasket is employed to permit a user to place and hold the display screen in a range of sliding and/or rotational positions with respect to the body portion. In a highly preferred embodiment of the present invention, the display screen has a screen backing from which the extension extends. Also preferably, the extension is in the form of a hub connected to the screen backing and having an aperture through which screen wiring passes from the display screen into a screen housing.

Preferably, the gasket is ring-shaped, is received around the hub, and is held between a surface of the screen housing and a compression member. The compression member can be a portion of the hub or can be a separate element attached to the hub, such as a plate-shaped element attached to the end of the hub. Most preferably, the compression member provides some degree of compressive force against the gasket to cause frictional engagement of the gasket against the body portion of the screen housing (and thereby to hold the display screen in desired positions via the hub in the aperture). The gasket can have different shapes and be located in other positions in the display screen apparatus to perform the same functions as the ring-shaped gasket.

The aperture in the body portion of the screen housing is preferably elongated to permit a user to shift the hub through the aperture and thereby to move the display screen through a range of positions. This range of positions is most preferably a vertical range of positions permitting a user to raise and lower and hold the display screen in a number of different vertical positions. The aperture in the body portion also preferably permits rotation of the display screen with respect to the screen housing. To limit rotation of the display screen, such as to prevent over-rotation of the display screen in the same rotational direction, the body portion of the screen housing preferably has a stop member which obstructs certain movement of a limit member coupled to the hub.

In one preferred embodiment of the invention the limit member is preferably a finger, arm, or extension of the compression member or of the hub itself, and preferably rotates with the hub (and the display screen) into and out of engagement with stop member(s) described above in one or more locations of the hub in the aperture. The stop member can take a number of different forms, but is preferably a lip or ridge located adjacent to the aperture in the body portion and against which the limit member coupled to the hub abuts in certain desired rotational and sliding positions of the hub in the aperture. In some highly preferred embodiments, the lip or ridge runs partially around the aperture in the body portion, leaving a gap for substantially unrestricted movement of the limit member and for passage of display screen wiring into the screen housing. The ends of this lip or ridge preferably serve as stops to prevent rotation in a desired rotational direction when the display screen is at an extreme end of the aperture (e.g., at the display screen's top position). In other embodiments of the present invention, the stop member can be located in various positions adjacent to the aperture of the body portion to obstruct or restrict rotation of the hub in those positions in the aperture.

In one preferred method of using the display screen apparatus of the present invention, the user grasps a portion of the display screen or frame connected thereto and pulls the display screen to pull the hub a distance along the aperture in the screen housing (against frictional force from the gasket). The display can preferably be left in any position to which the screen is pulled in the aperture. After the display has been moved a distance sufficient to permit the display screen and frame to rotate without interference with surrounding environment, the user then preferably rotates the display screen about 90 degrees from a portrait or landscape screen orientation to a landscape or portrait orientation, respectively. Again, the display can preferably be left in any orientation as it is rotated. Over-rotation is preferably prevented by interference of the limit member connected to the hub with the stop member of the screen housing. These elements also permit rotation of the screen only through a limited range. The screen can then be vertically slid to adjust the screen height, and can preferably again be left in any vertical position desired.

More information and a better understanding of the present invention can be achieved by reference to the following drawings and detailed description.

BRIEF DESCRIPTION OF THE DRAWINGS

The present invention is further described with reference to the accompanying drawings, which show preferred embodiments of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

In the drawings, wherein like reference numerals indicate like parts.

DETAILED DESCRIPTION OF THE PREFERRED EMBODIMENTS

With reference to FIGS. 1–7, a laptop computer 10 having a display according to the present invention is illustrated. The display 12 of the present invention can be used in conjunction with virtually any type of computer, and is shown and described herein by way of example on a laptop computer 10. The laptop computer 10 has a conventional base 14 preferably having a keyboard 16, internal electronics (not shown), one or more ports 18 for removably receiving media storage and retrieval devices (such as diskettes, compact disks, and the like) and a battery, and one or more ports 20 for connection of the computer 10 to electrical cables, leads, or other external wiring leading to associated equipment. These base components are conventional in nature and are not therefore described further herein.

The display 12 is rotatably mounted to the base 14 of the computer 10 in any conventional manner, such as by one or more hinges 22 as shown in the figures. The display 12 is therefore preferably movable between a position in which the display 12 lies adjacent and preferably substantially parallel to the base 14 and a position in which the display 12 is at an angle to the base 14 for user viewing. The display 12 has a screen 24 upon which graphics and/or text can be displayed in any conventional manner. Display screens (such as display screen 24) and their operation are well known to those skilled in the art and are not therefore described further herein. It should be noted that such a rotatable display is preferred for a number of applications such as on a laptop computer. However, many other applications of the display 12 can employ significantly different mounting arrangements, such as a generally vertical post mount permitting the display 12 to rotate about a substantially vertical axis, a ball and socket-type mount providing one or more degrees of freedom for the display position to be adjusted, and display mounts that do not permit display positional adjustment. In each case, the display 12 need not necessarily be mounted upon a computer base 14 as shown in the figures, but can instead be free-standing, connected in any conventional manner to a stand or platform, etc. In short, even though the position of the display screen 24 can be adjusted in a manner as will be described below, the position of the entire display 12 can be adjustable or non-adjustable as desired for any given application.

The display screen 24 preferably has a screen backing 26 attached to the display screen in any conventional manner, such as by being crimped or press-fit thereon, being fastened thereto by conventional fasteners such as rivets, screws, and the like, being soldered or glued thereon, etc. The display screen 24 preferably also has a frame 28 attached to the display screen 24 in any conventional manner just described. The screen backing 26 preferably has a hub 30 (see FIG. 4) extending from a rear surface thereof. Preferably, the hub 30 has a round cross-sectional shape and is an extension of the screen backing 26. The hub 30 serves as the rotational member about which the display screen 24 rotates as will be described in more detail below. The hub 30 preferably has an aperture 32 (see FIG. 4) therethrough or is hollow to permit screen wiring 34 to be passed from the display screen 24 through a generally central position behind the display screen 24. Although one centrally disposed aperture 32 in the hub 30 is preferred, any number of apertures passed through any location in the hub 30 for running the screen wiring 34 from the display screen 24 to the screen housing 36 (described below) can be used. To reduce the chances of the screen wiring 34 binding within the aperture 32, the aperture 32 is most preferably round or is rounded. The aperture 32 can instead be virtually any shape desired (including without limitation square, rectangular, slit-shaped, oval, polygonal, and the like).

Figure 4:
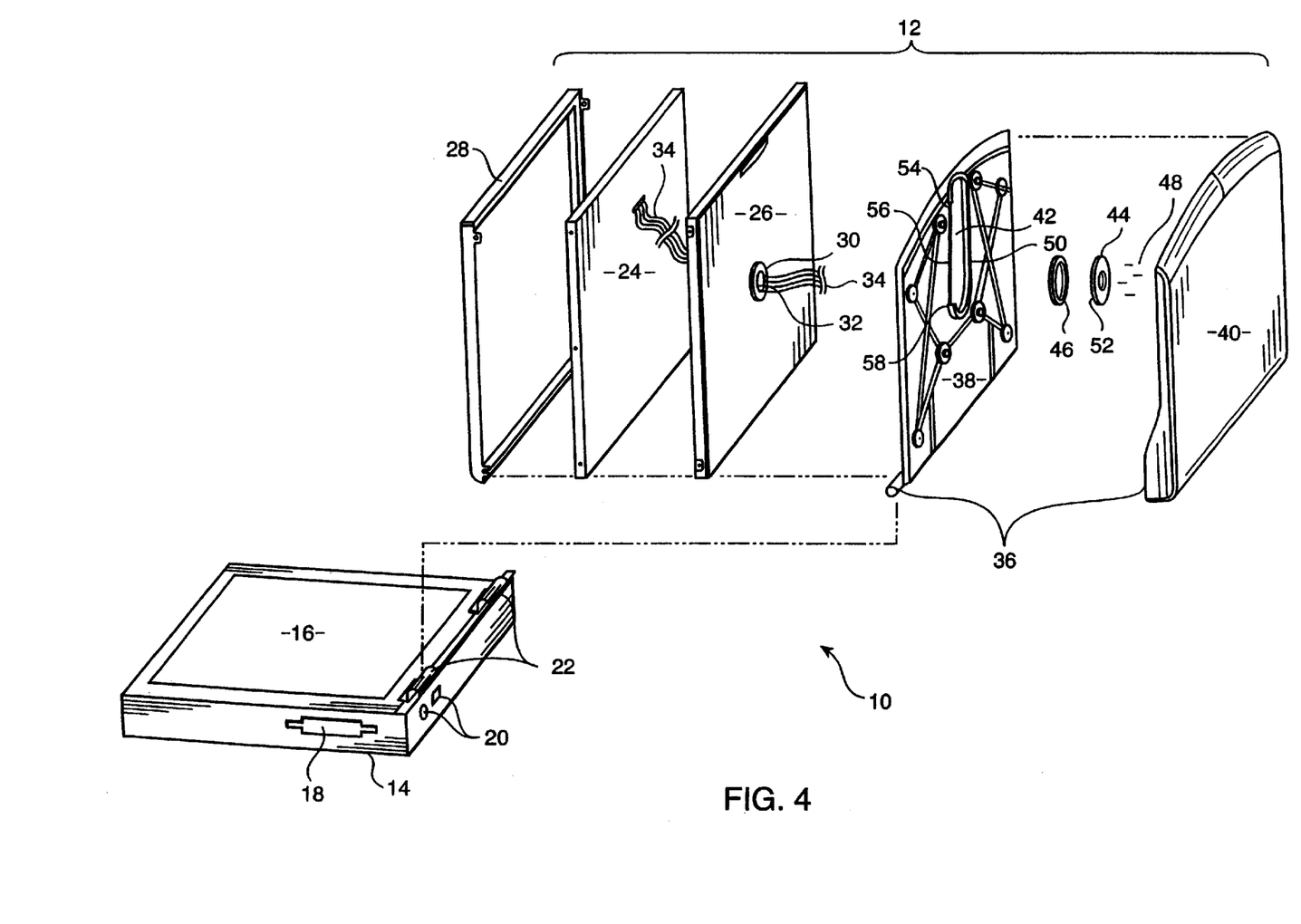
FIG. 4 is an exploded rear perspective view of the laptop computer illustrated in FIGS. 1–3, shown with the display screen in a landscape orientation.

The display 12 also preferably has a screen housing 36 located behind the display screen 24 and screen backing 26 as best shown in FIG. 4. The screen housing 36 preferably has a body portion 38 and an exterior shell 40. The body portion 38 has an aperture 42 within which is received the hub 30 of the screen backing 26. The hub and aperture connection between the display screen 24 and the screen housing 36 permits relative movement between these elements as will now be described.

With reference to FIGS. 1–3 and 5–7, the display screen 24 is pivotably mounted to the screen housing 36 via insertion of the hub 30 on the screen backing 26 in the aperture 42 of the screen housing 36. In highly preferred embodiments of the present invention such as that shown in FIGS. 1–7, the hub 30 is also slidable within the aperture 42 to permit translational movement of the display screen 24 with respect to the screen housing 36. For this purpose, the aperture 42 in the body portion 38 of the screen housing 36 is preferably elongated and permits the hub 30 to slide therealong.

The relationship between the hub 30 and the aperture 42 of the screen housing 36 at least partially determines how the display screen 24 reacts when moved by a user through its various positions. The screen 24 is rotatable and/or slidable with respect to the screen housing 36 to place the screen in multiple positions and/or orientations with respect to the screen housing 36. As such, the position and orientation of the aperture 42 in the screen housing 36 determines in what direction the screen 24 can be slid with respect to the screen housing 36. For example (and with regard to the laptop computer display 12 moved to a substantially vertical position), the aperture 42 can be oriented horizontally for horizontal sliding of the screen 24, can be oriented diagonally for horizontal and vertical sliding of the screen 24, and the like. Although any aperture orientation can be used in the present invention to accomplish any desired sliding movement of the display screen 24 with respect to the screen housing 36, the aperture 42 is preferably oriented substantially vertically to permit rotation of the display screen 24 as will be described below.

To attach the display screen 24 to the screen housing 36, the hub 30 of the screen backing 26 is preferably secured in the aperture 42 against removal therefrom. In highly preferred embodiments of the present invention, a plate 44 is attached to the hub 30 and is at least partially located behind the body portion 38 of the screen housing 36. Preferably, the plate 44 is attached to an end of the hub 30 in any conventional manner, such as by welding, gluing, brazing, soldering, keying, press-fitting, crimping, inter-engaging teeth or bumps, mating threads on the exterior of the hub 30 and interior of the plate 44, one or more pins, posts, or protrusions on the hub 30 and/or the plate 44 releasably engaging within grooves, detents, slots, or recesses within the plate 44 and/or hub 30, respectively. Most preferably, the plate 44 is attached to the end of the hub 30 by at least one conventional fastener (e.g., screws, rivets, bolts, pins, and the like). The plate 44 is preferably substantially round as shown in the figures, but can take any shape that is larger than the aperture 42 to prevent removal of the display screen 24 from the screen housing 36. For example, the plate 44 can be a cap, knob, flange, or other element attached to the hub 30. In some preferred embodiments, the plate 44 can even be integral with the hub 30, thereby defining a flared, bent, angled or otherwise enlarged hub end preventing removal of the hub 30 from the aperture 42. Of course, the shape of the hub end or plate 44 needed to prevent removal of the hub 30 from the aperture 42 is at least partially dependent upon whether the hub 30 is rotatable within the aperture 42 of the screen housing 36. As such, if the hub 30 is not rotatable (described below), the plate 44 can be replaced by a pin, post, tab, or other extension extending radially away from the hub 30 to a position behind the body portion 38 of the screen housing 36. In short, the hub 30 is preferably trapped within the aperture 42 of the screen housing 36 by an extension of the hub 30 located at least partially behind a portion of the screen housing 36 or an element attached to the hub 30 located at least partially behind a portion of the screen housing 36.

An increased amount of user control over the position and orientation of the display screen 24 is most preferable. Accordingly, the display screen 24 of the present invention is preferably movable through a range of different sliding positions and a range of different rotational orientations with respect to the screen housing 36. Preferably, the display screen 24 can be held in a number of places within these ranges to permit a user to locate the display screen 24 as desired. Most preferably, the display screen 24 can be held anywhere in these ranges. To enable this feature, the display 12 preferably employs at least one gasket located between a portion of the screen backing 26 and a portion of the screen housing 36. In the preferred embodiment of the present invention shown in the figures, the gasket 46 is annular in shape, is fitted about the hub 30 of the screen backing 26, and is located between the body portion 38 of the screen housing 36 (near the aperture 42) and the clamp plate 44. To hold the screen 24 in a number of different positions and orientations as just described, the gasket 46 is preferably compressed by the clamp plate 44 against the area of the body portion 38 adjacent to the aperture 42. The clamp plate 44 thereby acts as a compression member or element against the gasket 46, which is frictionally engaged against the body portion 38. By pressing the gasket 46 in this manner, frictional force between the gasket 46 and the body portion 38 of the screen housing 36 prevents screen slippage. The compression of the gasket 46 is preferably large enough to prevent such slippage but can be overcome by a user grasping and pulling, pushing, or rotating the display screen 24.

In the preferred embodiment shown in the figures, the gasket 46 is attached to the hub 30 (and thereby to the screen backing 26 and display screen 24) by being located around the hub 30 and held thereon by the clamp plate 44. The gasket 46 preferably moves with the hub 30, screen backing 26, and display screen 24 when the display screen 24 is moved by a user. It should be noted that the gasket 46 can take a number of different shapes and forms and be located in a number of different locations on or in the display 12 to accomplish the same functions described above. For example, the gasket 46 can be attached to the screen housing 36 so that the gasket 46 does not move with the display screen 24, screen backing 26, and hub 30. Specifically, the gasket 46 can line and/or be located around the aperture 42 in the screen housing 36 so that a light compression exists between the hub 30 and the gasket 46. Such a gasket can take the form of elongated strips on the inside walls of the aperture 42 or on the edges thereof, an oval or elongated loop of gasket material in the same locations, etc. Alternatively, the gasket 46 can be attached to the clamp plate 44 in any conventional manner (e.g., by adhesive or cohesive, one or more fasteners, and the like) for compression against the body portion 38 of the screen housing 36. The gasket 46 can instead be attached to the outer surface of the hub 30 in any conventional manner. The gasket 46 can even be part of or integral with the clamp plate 44 or hub 30. Multiple gaskets can also be used, if desired, and can be located in any of the positions just described. In each of the embodiments just described, a gasket 46 is compressed between the body portion 38 of the screen housing 36 and clamp plate 44 or between the body portion 38 of the screen housing 36 and the hub 30 to frictionally engage at least one of the screen housing 36, the clamp plate 44, the body portion 38, and the hub 30.

It will be appreciated by one having ordinary skill in the art that the gasket 46 can be located between any element movable with the display screen 24 and any other element stationary with respect to the screen housing 36 to accomplish the same position and orientation-holding functions described above. For example, the gasket 46 can be attached to the body portion 38 of the screen housing 36 in a location adjacent to the aperture 42 and between the screen backing 26 and the body portion 38. The gasket 46 is therefore lightly compressed and can provide frictional holding engagement between the screen backing 26 and the body portion 38 of the screen housing 36. As another example, the gasket 46 can be attached to the screen backing 26 (preferably in a location where it remains in contact with the body portion 38 of the screen housing 36 in the display screen's full range of motion) in any conventional manner. Once again, the gasket 46 is therefore lightly compressed and can provide frictional holding engagement between the screen backing 26 and the body portion 38 of the screen housing 36. Still other gasket locations are possible and fall within the spirit and scope of the present invention.

Because the amount of gasket compression at least partially determines the amount of force required by the user to shift or rotate the display screen 24, some highly preferred embodiments of the present invention permit gasket compression adjustment. In the preferred embodiment of the present invention shown in FIGS. 1–7, compression upon the gasket 46 can be set by the tightness of the fasteners used to hold the gasket 46 in place upon the hub 30. For example, the fasteners 48 can be screws exerting a varying compressive force by the clamp plate 44 by their degree of tightness, or can be rivets having a length selected to exert a desired amount of compression upon the gasket by the clamp plate 44. As another example, the gasket 46 of the illustrated preferred embodiment can be compressed to a desired degree by a clamp plate 44 threaded upon the hub 30 and turned a desired amount to compress the gasket 46 against the body portion 38 of the screen housing 36. In other gasket embodiments such as those described above, the gasket 46 can be compressed by drawing the screen 24 closer to the body portion 38 of the screen housing 36. For example, the hub 30 can be received within the aperture 42 of the screen housing 36 with a desired pre-load to thereby compress a gasket located between the screen backing 26 and the body portion 38 of the screen housing 36, or the clamp plate 44 can be tightened to draw the hub 30 through the aperture 42 and toward the screen housing 36 for a similar result.

The gasket compression selected can be non-adjustable (such as a desired factory-selected compression used during assembly of the display 12) or adjustable by a user as desired. Permitting adjustability of gasket compression permits a user to adjust the "stiffness" of the screen to his or her preference, can allow a user to fix the display screen 24 in a desired position or orientation such that further display screen movement can only be accomplished by loosening gasket compression, and permits adjustment for gasket wear.

It should be noted that the round gasket shape illustrated in the figures is only one of several gasket shapes that can be used in the present invention. The particular shape selected for any given embodiment depends at least partially upon the gasket location (e.g., around the hub 30, lining the aperture 42, attached to the screen backing 26 or body portion 38, etc.). For example, the gasket 26 can be one or more belts, strips, blocks, bumps, ribs, wedges, or any other shapes attached to their associated element(s) in any conventional manner, including without limitation gluing, fastening with conventional fasteners, recessed within mating receptacle(s), and the like. All such elements fall within the meaning of the term "gasket" as used herein and in the appended claims.

It may be desirable to limit rotation of the display screen 24 in one or more display screen positions. As such, some highly preferred embodiments of the present invention employ a connection between the display screen 24 and the screen housing 36 that limits display screen rotation. With reference to FIGS. 4–7, a preferred manner for limiting display screen rotation is a stop member 50 adjacent to the aperture 42 in the body portion 38 of the screen housing 36. Although the stop member 50 can take a number of different forms as described below, the stop member 50 is preferably a lip 50. The lip 50 is preferably integral with the body portion 38, but can instead be a separate element attached thereto in any conventional manner. For reasons that will be described below, the lip 50 preferably extends partially around the aperture 42 as shown in the figures. The clamp plate 44 preferably has a limit member in the form of an extension 52 extending from the clamp plate 44. The extension interferes with the lip 50 in various sliding positions and rotational orientations of the display screen 24. Most preferably, the lip 50 extends around the upper and lower ends of the elongated aperture 42 in the body portion 38 of the screen housing 36, and also extends along one side of the elongated aperture 42. The clamp plate 44 is preferably oriented with respect to this lip 50 so that the lip 50 prevents full rotation of the hub 30 when the display screen 24 is rotated. This prevents the user from continuously rotating the display screen 24 in the same direction (which can eventually damage the electrical connections to the display screen 24). As will now be described, this relationship between the extension 52 and the lip 50 can also be used to prevent rotation of the display screen 24 in a particular direction.

Figure 1:
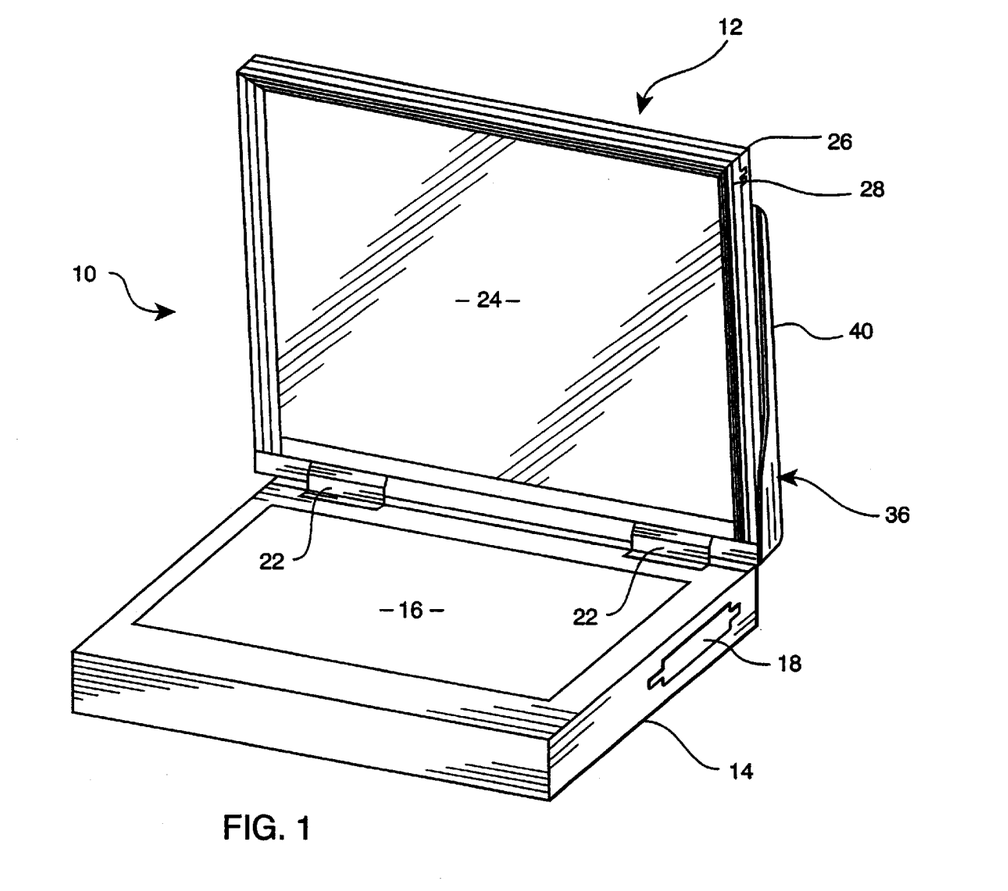
FIG. 1 is a front perspective view of a laptop computer having a display according to a preferred embodiment of the present invention, shown with the display screen in a landscape orientation.
Figure 2:
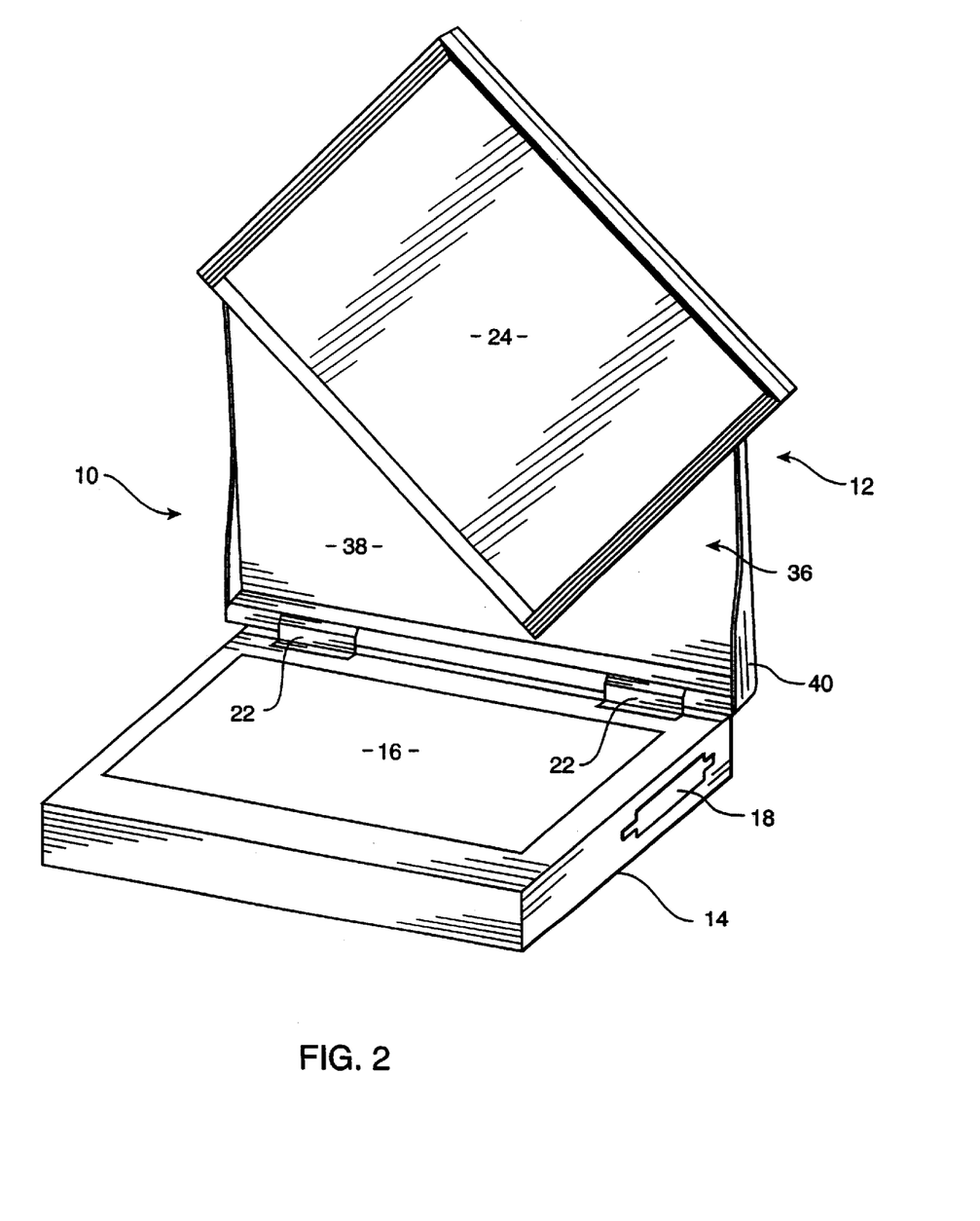
FIG. 2 is a front perspective view of the laptop computer illustrated in FIG. 1, shown with the display screen being rotated from a landscape orientation to a portrait orientation.
Figure 3:
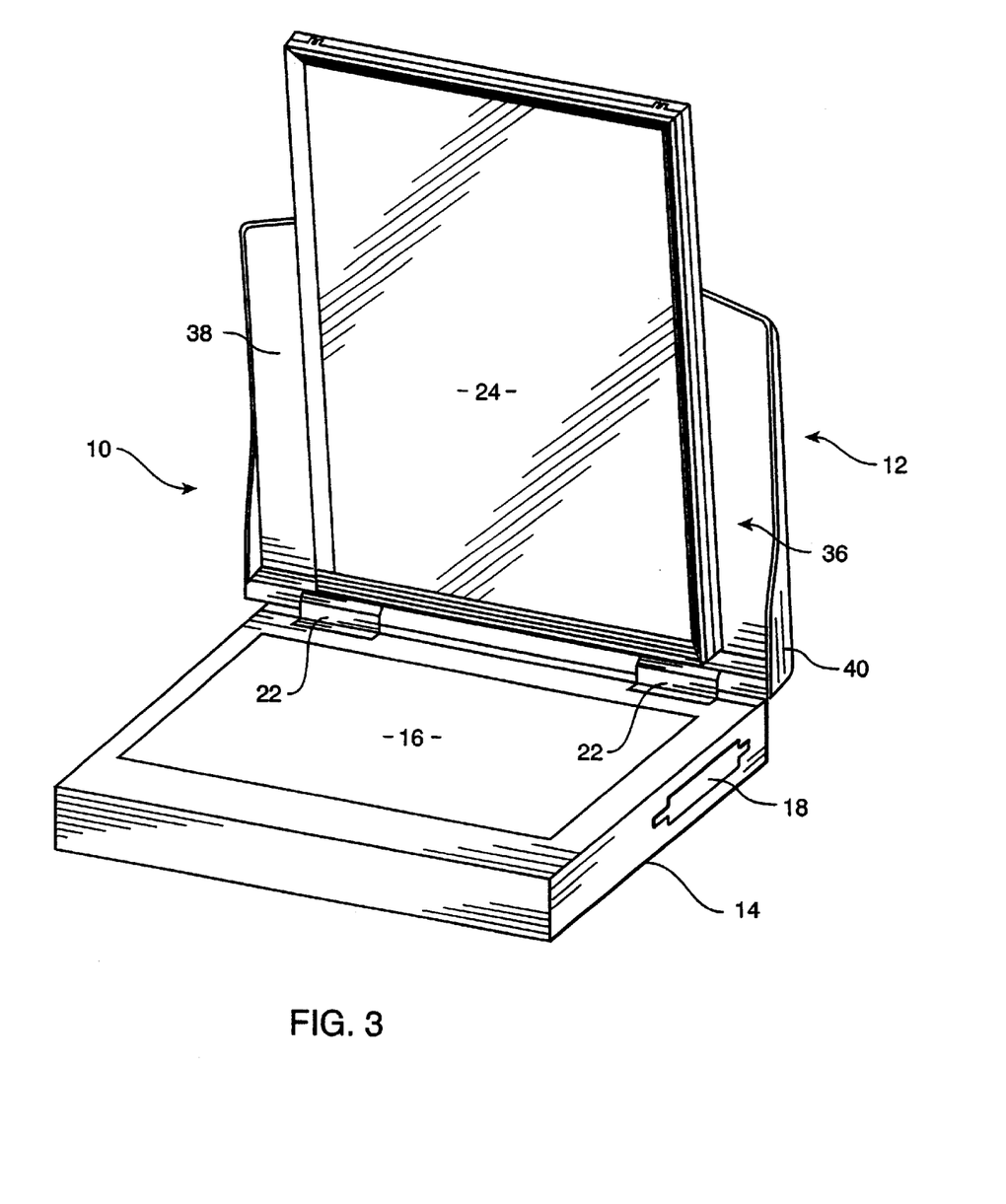
FIG. 3 is a front perspective view of the laptop computer illustrated in FIGS. 1 and 2, shown with the display screen in a portrait orientation.
Figure 5:
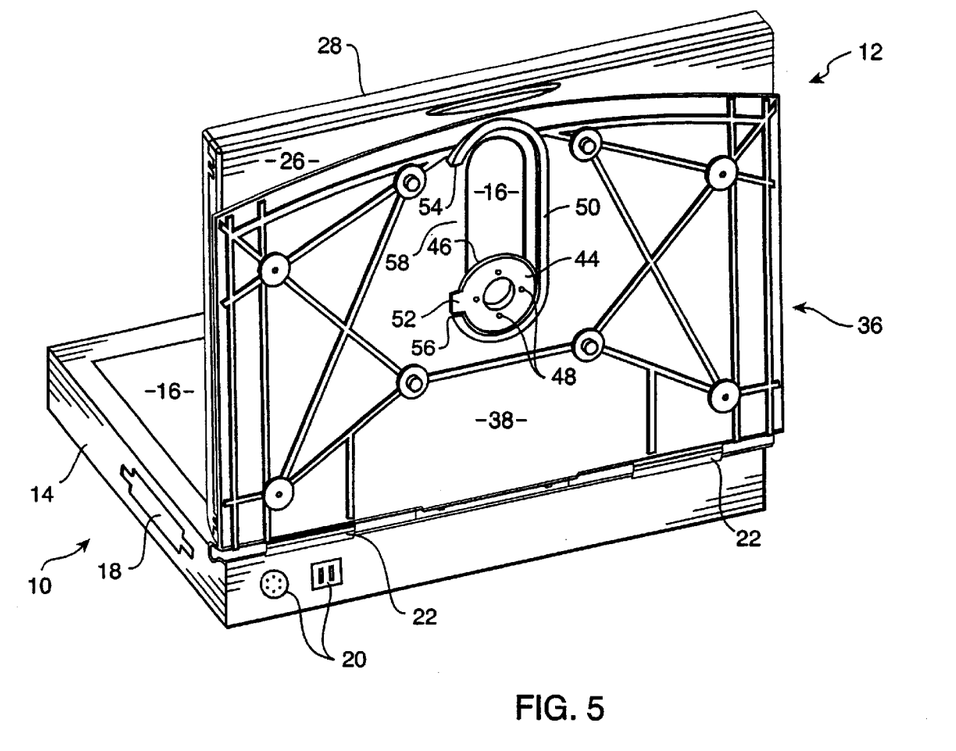
FIG. 5 is a rear perspective view of the laptop computer illustrated in FIGS. 1–4, shown with part of the screen housing removed and with the display screen in a landscape orientation.
Figure 6:
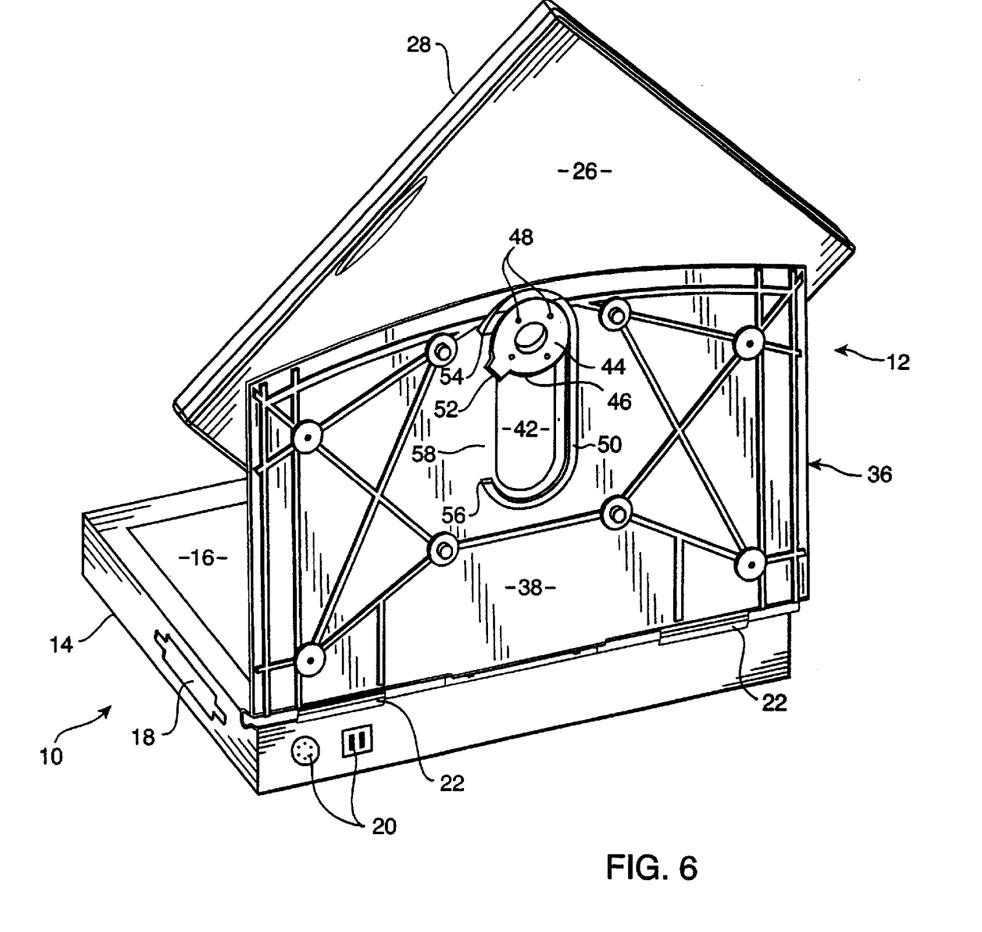
FIG. 6 is a rear perspective view of the laptop computer illustrated in FIGS. 1–5, shown with part of the screen housing removed and with the display screen being rotated from a landscape orientation to a portrait orientation.
Figure 7:
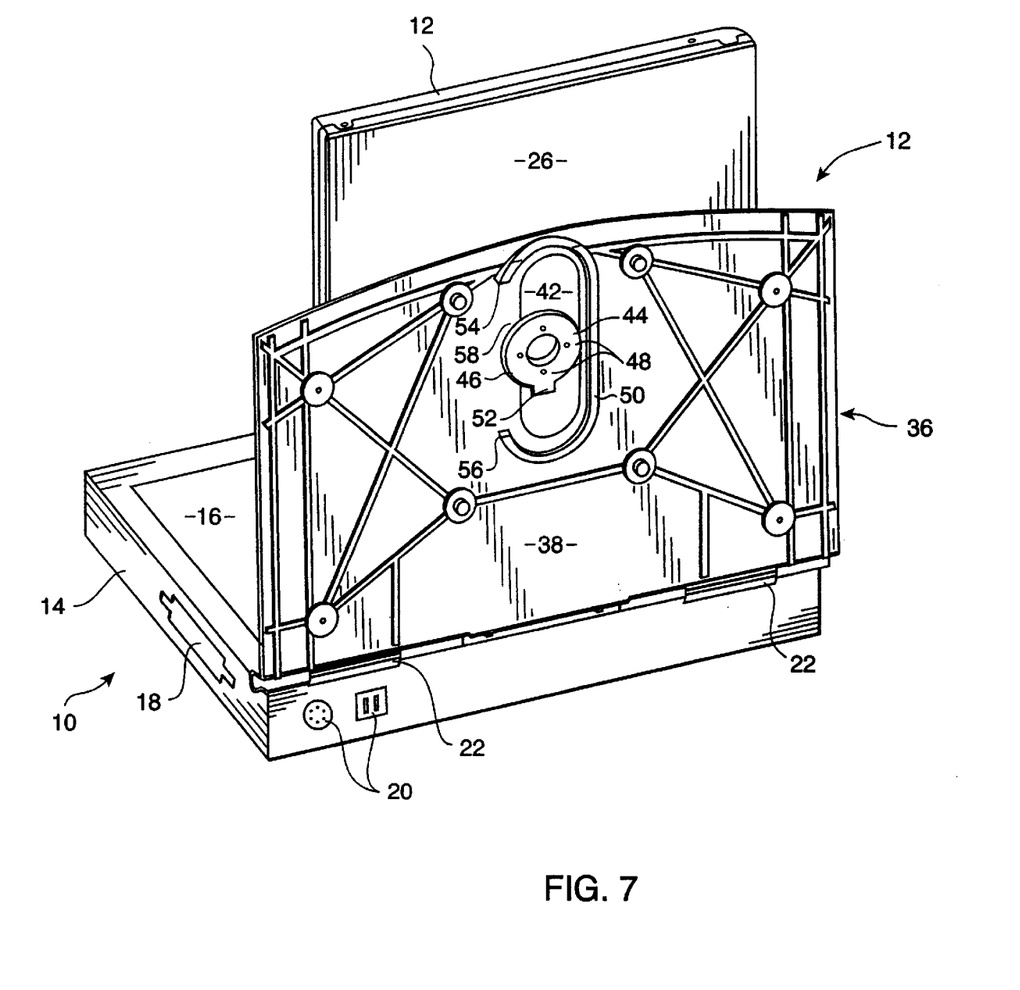
FIG. 7 is a rear perspective view of the laptop computer illustrated in FIGS. 1–6, shown with part of the screen housing removed and with the display screen in a portrait orientation.

With reference to FIGS. 1 and 5, the display screen 24 of the laptop computer 10 is shown in its landscape orientation with the hub 30 positioned at its lowest point in the elongated aperture 42 of the screen housing 36. In this position, rotation of the display screen 24 is not possible because inadequate clearance exists for the bottom corners of the display screen 24 to rotate. However, the display screen 24 can be grasped by a user and shifted along elongated aperture 42 against the frictional force of the gasket 46 upon the body portion 38 of the screen housing 36. If desired, the display screen 24 can preferably be shifted (without rotation) to any position in the elongated aperture 42 to be held in such position by frictional engagement of the gasket 46. This permits a user to raise and lower the display screen 24 to any desired viewing height in an infinite range of viewing heights. Raising the display screen 24 also enables rotation of the display screen 24 as is shown in FIGS. 2 and 6. In an application such as that shown in the figures, the amount of rotation can first be limited by lack of rotational clearance for the display screen lower corners. However, the display screen 24 can preferably be raised sufficiently to permit these corners to clear and to thereby permit the display screen 24 to rotate to a portrait orientation as shown in FIGS. 3 and 7. Due again to the frictional engagement of the gasket 46 as described above, the display screen 24 can preferably be left and held in any rotational orientation to which it is moved by a user. In the portrait orientation shown in FIGS. 3 and 7, the display screen 24 can also be moved upward and downward to be held by the gasket 46 in any position desired (limited by the dimensions of the display screen 24 and/or the size of the aperture 42) as described above with reference to the landscape position of the display screen 24.

The extension 52 of the clamp plate 44 preferably prevents over-rotation of the display screen 24 in either direction by contacting and being blocked by the lip 50 adjacent to the aperture 42. More preferably, the display screen 24 can only be rotated to a portrait orientation in one direction. To limit display screen rotation in this manner, the lip 50 is preferably located to contact and block rotation of the clamp plate extension 52 once the display screen 24 has been raised sufficiently to clear rotation of the display screen's bottom corners. As shown in FIGS. 5–7, the lip 50 preferably has a stop portion 54 near the top of the elongated aperture 42 that prevents rotation of the clamp plate extension 52 in one direction when the display screen 24 is raised as shown in FIG. 6 (the display screen 24 being shown rotated in an opposite direction in FIG. 6). Another stop portion 56 of the lip 50 can be useful to prevent similar rotation in applications where the display screen 24 is not blocked from rotation by its bottom corners when in its lower position shown in FIG. 5.

Although the lip 50 and its stop portions 54, 56 are preferred for limiting rotational movement of the hub 30 and the display screen 24 as just described, one having ordinary skill in the art will appreciate that many other elements can be used to perform this same function. For example, the lip 50 can be replaced by any number of elements attached to or integral with the body portion 38 of the screen housing 36 adjacent to the aperture 42 therein, including without limitation one or more pins, posts, ramps, teeth, ribs, or other protrusions on the body portion 38 upon or against which the clamp plate extension 52 is movable to limit clamp plate movement. Such elements can be in selected locations adjacent to the aperture 42 to permit hub and screen rotation in certain hub positions in the aperture 42 and to provide limited or no hub and screen rotation in other hub positions in the aperture 42 in a manner similar to the lip shape and position described above. Similarly, one having ordinary skill in the art will appreciate that the clamp plate extension 52 can take a number of different forms capable of motion limiting contact with the lip 50 (or other element or structure as just described). For example, other limit members can be used in place of the clamp plate extension 52, including without limitation one or more pins, posts, ramps, teeth, ribs or other protrusions extending from the clamp plate 44 for motion limiting contact with the lip 50. The limit member(s) need not be a part of or connected to the clamp plate 44, but can instead be integral with or an element connected to the hub 30 or screen backing 26 in any conventional manner.

While the clamp plate extension 52 or other limit member can contact and abut a stop surface connected to the body portion 38 as described above, it should be noted that other relationships between the clamp plate 44 and body portion 38 are possible. By way of example, only, the edges of the aperture 42 can be shaped to permit hub rotation only in desired portions of the aperture 42. In such cases, the clamp plate extension 52 can be at least partially located within the aperture 42 and can be blocked by internal aperture wall(s) in certain portions of the aperture 42 while not being thus blocked in other portions of the aperture 42. Alternatively, the hub 30 can be square, rectangular, have flats, or otherwise be shaped to fit within certain portions of the aperture 42 without the ability to rotate therein, but can be rotatable in other (e.g., wider) portions of the aperture 42.

In alternative embodiments of the present invention, the extension and stop relationship between the display screen 24 and the body portion 38 of the screen housing 36 can even be reversed, with the hub 30 being shaped to contact and abut one or more extensions located adjacent to the aperture 42 to limit hub rotation therein. These extensions can be one or more walls, posts, arms, or other elements extending at least partially into the travel path of the hub 30 as it moves through the aperture 42 and are shaped to contact and abut one or more surfaces of the hub 30 to prevent or limit hub rotation in desired hub positions within the aperture 42. Still other elements limiting hub rotation in desired hub locations in the aperture 42 are possible and fall within the spirit and scope of the present invention.

As described above, the hub 30 preferably has an aperture 32 therethrough through which screen wiring 34 can be passed from the screen housing 36 to the display screen 24. Although screen wiring 34 need not necessarily be passed though the hub 30 in this manner (or through the hub 30 at all for electrical connection to the display screen 24), this arrangement is most preferred. As best shown in FIG. 4, the screen wiring 34 is preferably run through the hub aperture 32 (and therefore through the aperture 42 in the body portion 38 of the screen housing 36) and into screen housing 36 via a gap 58 in the lip 50 of the body portion 38. The gap 58 is preferably sufficiently long to receive the screen wiring 34 in all positions of the hub 30 in the aperture 42. In this manner, the screen wiring 34 preferably enters a space between the body portion 38 and the shell 40 of the screen housing 36 laterally through the gap 58. The screen wiring 34 thereafter preferably extends toward an edge of the body portion 38 and then to connected equipment, such as the base 14 of the laptop computer 10. The screen wiring 34 itself and its connection to the display screen 24 and to upstream components or devices is conventional in nature and is not therefore described further herein.

The frame, screen backing, screen housing, and clamp plate can be made of any rigid or substantially rigid material desired, including without limitation plastic, metal (e.g., aluminum, steel, etc.), composites, or combinations thereof. Most preferably however, the screen backing 26 is made from an electromagnetic interference-shielding material as mentioned above, while the frame 28, screen housing 36, and clamp plate 44 are made of plastic. The gasket 46 is preferably made from a low-wear material such as Teflon® or engineered plastic, but can instead be made from any plastic, metal, composite, or combination thereof.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims. For example, the hub 30 of the screen backing 26 is preferably generally round in shape to better enable rotation of the hub 30 within the aperture 42 of the screen housing 36. However, other hub shapes and types can instead be used which permit relative rotation between the screen backing 26 and the screen housing 36, including without limitation a hub 30 in the form of a pin, post, or shaft that is solid (where the screen wiring 34 is fed to the display screen 24 in another location) or that has an aperture 32 therethrough, and that has a circular, oval, square, polygonal or any other constant or varying cross sectional shape capable of being rotated within the aperture 42. In general, any extension of the screen backing 26 having any shape sized to be rotatably received (whether limited or not) within the aperture 42 of the screen housing 36 can be used as desired. Such an extension can be integral with the screen backing 26 or can be attached thereto in any manner, such as by welding, conventional fasteners, adhesive, brazing, and the like. The term "hub" herein and in the appended claims refers to all such elements and structure.

Also, the screen backing 26 of the present invention preferably encloses the back of the display screen 24, or at least substantially covers the back of the display screen 24. The screen backing 26 can be made of any material capable of shielding the display screen 24 from electromagnetic interference as is well known to those skilled in the art. As an alternative to an enclosed or substantially covered display screen back, other embodiments of the present invention can employ a screen backing 26 having other shapes and covering any desired amount of the display screen back. Preferably at a minimum, the screen backing 26 provides a structural member to which the hub 30 is attached or from which the hub 30 extends. The screen backing 26 can therefore be a strip of rigid or semi-rigid material spanning across at least part of the back of the display screen 24, a frame of wire, rods, bars, strips, or other elements located behind the display screen 24 and attached thereto in any conventional manner, or even an island of rigid or semi-rigid material attached to the back of the display screen 24 in any conventional manner (such as by adhesive, soldering, conventional fasteners, brazing, welding, and the like) and to which the hub 30 is attached or from which the hub 30 extends. In short, any element or structure providing sufficient support for the hub 30 to withstand stresses from display screen rotation and movement during use can be employed for the screen backing 26. This element or structure can be any shape or size capable of providing the hub 30 with such support, and can be directly or indirectly connected to the display screen 24. In this regard, if the display screen 24 is sufficiently strong to withstand the stresses of screen rotation and movement by a user, it is also possible to connect the hub 30 directly to the back of the display screen 24 in any of the manners described above with reference to the connection between the screen backing 26 and the display screen 24. In still other embodiments of the present invention, the hub 30 can even be part of the display screen 24 itself, such as a rearward extension of a casing of the display screen. It should be noted that the ability to attach the hub 30 or the screen backing 24 to a rear surface of the display screen 24 will depend in part upon the design and structure of the display screen 24, the potential exposure of screen electronics and circuitry to damaging stresses and/or heat from certain methods of attachment, etc.

The screen housing 36 described above and illustrated in the figures is preferred for a number of applications, including for laptop computer applications. However, numerous other screen housing shapes and sizes are possible, some of which do not function to "house" the display screen 24. For example, the screen housing 36 need not necessarily be a two-piece structure such as in the preferred embodiment of the present invention. The screen housing 36 can instead be one element of any shape and having an aperture 42 therethrough for receiving the hub 30 as described above. Alternatively, the screen housing 36 can be made of multiple body elements having any desired assembled shape and size, with one or more of the body elements defining the aperture 42 within which the hub 30 is received. As another example, the screen housing 36 can be a bar or post having an aperture therethrough for receiving the hub 30 as described above. The bar can be hollow to hide such elements as the gasket 46 and clamp plate 44 therein or can be solid to permit the hub 30 to pass completely therethrough. Also, the screen housing 36 need not necessarily enclose the screen wiring 34 extending through the hub aperture 32. The screen housing 36 at least provides a structure or framework upon which the hub 30 is rotatably mounted (i.e., in an aperture 42) and which is sufficiently rigid and strong to withstand the stresses of display screen rotation and movement by a user. Any element or combination of elements with these features can be used for the screen housing 36 and is encompassed by the term "screen housing" as used herein and in the appended claims.

As indicated above, movement of the hub 30 can be limited and controlled to result in display screen movability that is significantly different from that described above and illustrated in the figures. Whereas a relatively vertical aperture 42 permitting vertical display screen travel and display screen rotation in a middle or upper range of the aperture 42 is preferred and is most useful for applications such as laptop computers, other display screen mobility is also possible. For example, the aperture 42 can be oriented in any direction to permit screen movement that is other than vertical (e.g., diagonal, horizontal, etc.) as mentioned above. Also, the aperture 42 can trace a path for the hub 30 that is not straight as shown in the figures. Specifically, the aperture 42 can be bent, bowed, curved, angled, or otherwise have two or more segments running in different directions. The aperture 42 can even have one or more forked portions permitting the hub 30 and the display screen 24 to be moved by the user through one or more different paths and into different positions therein. Such alternative apertures 42 are used to enable hub and display screen movement through a path that is straight, bent, curved or has a combination of such features. Regardless of the size, shape, and orientation of the aperture used in any particular embodiment of the present invention, rotation of the hub 30 can be limited in any manner described above in any portion or portions of the aperture 42. The hub 30 can even be freely rotatable in all positions within the aperture 42 or can be partially or entirely limited from rotation in all positions within the aperture 42 as desired. Similarly, the aperture 42 can be shaped to permit only full or limited hub rotation (without any hub translation). All such aperture shapes, sizes, and orientations fall within the spirit and scope of the present invention.

It should be noted that throughout the specification and claims herein, when one element is said to be "coupled" to another, this does not necessarily mean that one element is directly fastened, secured, or otherwise attached to another element. Instead, the term "coupled" means that one element is either connected directly or indirectly to another element or is in mechanical communication with another element. Examples include indirectly or directly attaching one element to another (e.g., via welding, bolting, gluing, mating, frictionally engaging, compressing together or against, etc.), elements that are integral with one another or are made from the same element or body, elements which can act upon one another (e.g., via camming, pushing, or other interaction) and one element imparting motion directly or through one or more other elements to another element.

We claim:

1. A pivotable display apparatus for a computer, comprising:
   a display screen;
   a body portion having an elongated aperture therethrough;
   a screen backing coupled to the display screen, the screen backing having a hub extending into the elongated aperture of the body portion, the hub and display screen pivotable within the elongated aperture; and
   a gasket coupled to hub of the screen backing and to the body portion, one of the body portion and the hub movable with respect to the gasket to permit the hub of the screen backing to slide along the aperture of the body portion under frictional force of the gasket, the frictional force sufficient to retain the display screen in different positions with respect to the body portion.

2. The display apparatus as claimed in claim 1, wherein the hub has an aperture therethrough.

3. The display apparatus as claimed in claim 2, further comprising at least one electrical wire extending through the elongated aperture of the body portion via the aperture in the hub of the screen backing.

4. The display apparatus as claimed in claim 1, further comprising a compression member coupled to the screen backing, at least a portion of the gasket compressed between the compression member and a surface of the body portion to frictionally engage the screen backing to the body portion.

5. The display apparatus as claimed in claim 4, wherein the compression member is part of the hub.

6. The display apparatus as claimed in claim 4, wherein the compression member is coupled to a distal end of the hub.

7. The display apparatus as claimed in claim 1, wherein the gasket is compressed between respective portions of the screen backing and the body portion.

8. The display apparatus as claimed in claim 1, wherein the gasket is located along at least a portion of the elongated aperture and is not movable with respect thereto.

9. The display apparatus as claimed in claim 1, further comprising a stop member coupled to the body portion and extending partially around the elongated aperture for limiting motion of the hub in the elongated aperture.

10. The display apparatus as claimed in claim 9, wherein the stop member is a lip having an opening along at least one side of the elongated aperture.

11. The display apparatus as claimed in claim 9, further comprising an limit member coupled to the hub for rotation therewith, the limit member contacting the stop member in at least one position of the hub in the elongated aperture to limit rotation of the hub.

12. The display apparatus as claimed in claim 9, wherein a portion of the hub interferes with the stop member in at least one position of the hub in the elongated aperture to limit rotation of the hub.

13. A computer monitor display apparatus, comprising:
   a display screen;
   a screen backing coupled to the display screen, the screen backing having:
      a front surface;
      a rear surface; and
      a hub extending from the rear surface of the screen backing;
   a body portion coupled to the screen backing, the body portion having an elongated aperture therein within which is slidably received the hub; and
   a gasket coupled to the screen backing and frictionally engaged with the body portion to retain the display screen via frictional force in different positions with respect to the body portion, the gasket permitting sliding and rotation of the hub in the elongated aperture against the frictional force between the gasket and the body portion.

14. The display apparatus as claimed in claim 13, wherein the hub has an aperture therethrough extending from the front surface of the screen backing to the rear surface of the screen backing.

15. The display apparatus as claimed in claim 14, further comprising at least one electrical wire extending from the display screen and through the elongated aperture in the body portion via the aperture in the hub.

16. The display apparatus as claimed in claim 13, further comprising a compression member coupled to the hub, wherein the gasket is coupled to the screen backing by the compression member.

17. The display apparatus as claimed in claim 16, wherein the gasket is compressed between the compression member and the body portion to frictionally engage the screen backing to the body portion.

18. The display apparatus as claimed in claim 13, wherein the gasket lines at least a portion of the elongated aperture.

19. The display apparatus as claimed in claim 13, wherein the gasket is located beside at least a portion of the elongated aperture for frictional engagement with the hub.

20. The display apparatus as claimed in claim 13, wherein the gasket is compressed between adjacent portions of the screen backing and the body portion.

21. The display apparatus as claimed in claim 13, further comprising:
   a limit member coupled to the hub; and
   a stop member coupled to the body portion, the limit member extending radially from the hub and movable into contact with the stop member in at least one position of the hub in the elongated aperture to limit rotation of the hub.

22. The display apparatus as claimed in claim 21, wherein the limit member is coupled to an end of the hub.

23. The display apparatus as claimed in claim 21, wherein the limit member is an extension of the hub.

24. A method of coupling a display screen to a display screen housing, comprising the steps of:
   providing a screen backing coupled to the display screen, the screen backing having a rearwardly-extending extension;

inserting the extension of the screen backing into an aperture in the display screen housing;

coupling the extension of the screen backing to the display screen housing for pivotal and sliding movement in the aperture;

coupling a gasket to the screen backing and to the display screen housing; and compressing the gasket to frictionally engage the screen backing with the display screen housing, the gasket retaining the display screen in different relative positions with respect to the display screen housing via frictional engagement.

25. The method as claimed in claim 24, wherein the extension is a hub.

26. The method as claimed in claim 24, further comprising passing at least one electrical wire through the aperture in the screen housing via an aperture in the extension.

27. The method as claimed in claim 24, wherein coupling the gasket to the screen backing and to the display screen housing includes coupling a compression member to the extension to retain the gasket between the compression member and the display screen housing.

28. The method as claimed in claim 27, wherein the gasket is compressed against the display screen housing via the compression member.

29. The method as claimed in claim 24, wherein the extension of the screen backing is inserted from one side of the display screen housing and wherein the extension is coupled to the display screen housing from an opposite side of the display screen housing.

30. The method as claimed in claim 24, wherein the gasket is ring-shaped and wherein coupling the gasket to the screen backing and to the display screen housing includes placing the gasket around the extension of the screen backing.

31. The method as claimed in claim 24, wherein coupling the gasket to the screen backing also includes coupling a compression member over the gasket upon the extension.

32. The method as claimed in claim 24, wherein coupling the gasket to the screen backing and to the display screen housing includes attaching the gasket to the display screen housing for sliding movement of the extension thereupon.

33. The method as claimed in claim 24, further including limiting rotation of the screen backing by a limit member coupled to the display screen housing.

34. The method as claimed in claim 33, wherein the limit member contacts a stop adjacent to the aperture to limit screen backing rotation in at least one position of the extension in the aperture.

* * * * *